H. R. MOULE.
AUTOMOBILE LOADING SYSTEM.
APPLICATION FILED MAY 13, 1918.
1,272,501.
Patented July 16, 1918.
2 SHEETS—SHEET 1.
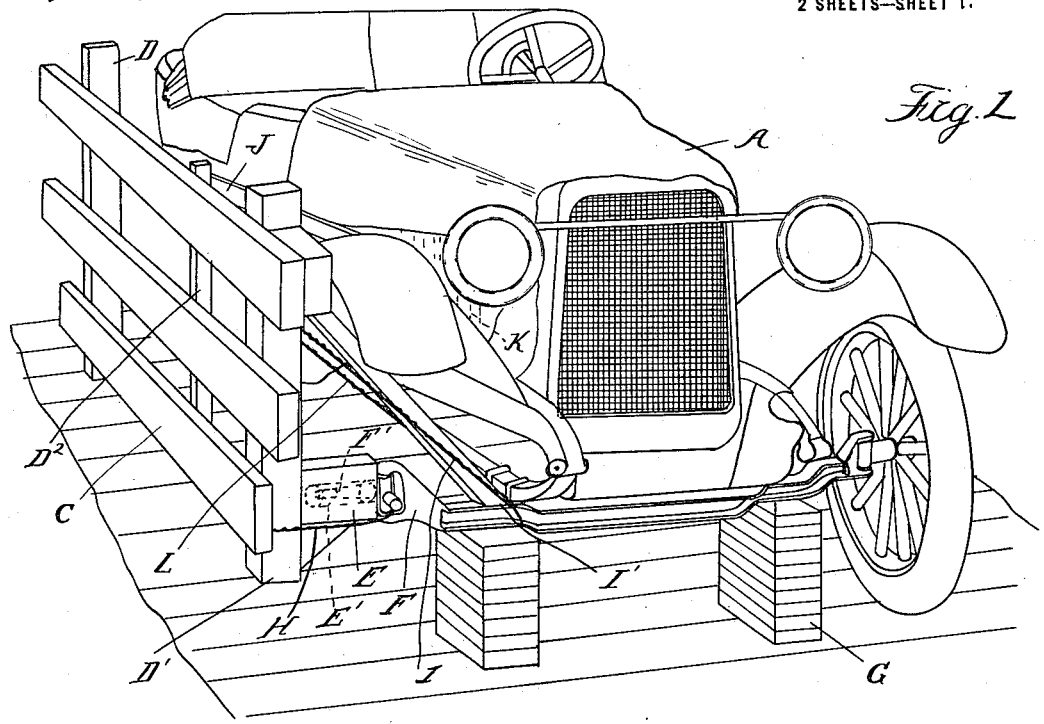
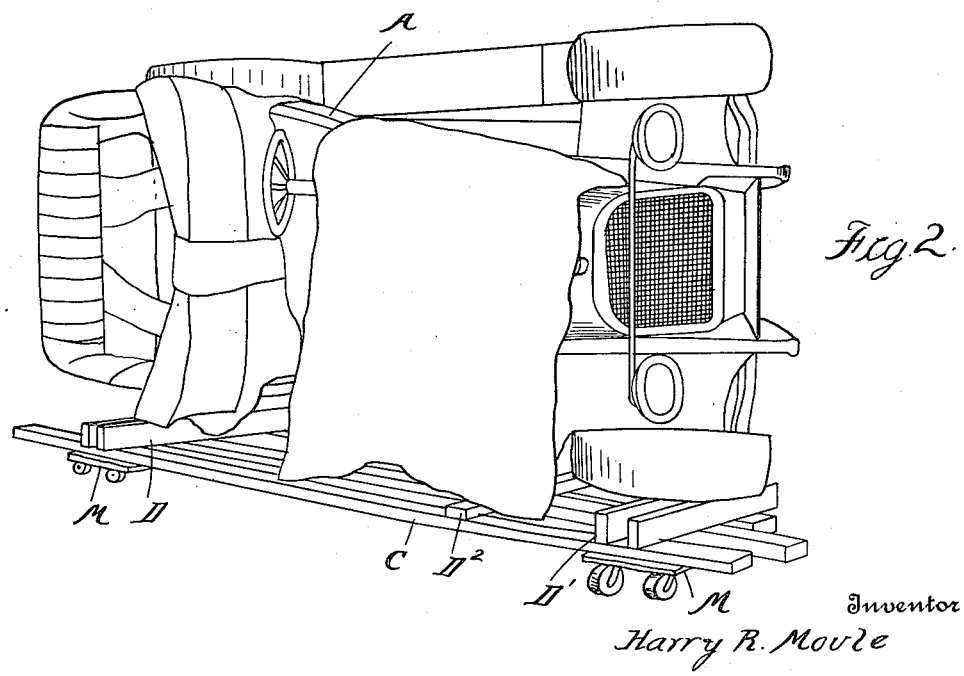
Inventor
Harry R. Moule

UNITED STATES PATENT OFFICE.

HARRY R. MOULE, OF DETROIT, MICHIGAN, ASSIGNOR TO MAXWELL MOTOR COMPANY, INC., OF DETROIT, MICHIGAN, A CORPORATION OF DELAWARE.

AUTOMOBILE-LOADING SYSTEM.

1,272,501. Specification of Letters Patent. Patented July 16, 1918.

Application filed May 13, 1918. Serial No. 234,099.

*To all whom it may concern:*

Be it known that I, HARRY R. MOULE, a citizen of the United States of America, residing at Detroit, in the county of Wayne and State of Michigan, have invented certain new and useful Improvements in Automobile-Loading Systems, of which the following is a specification, reference being had therein to the accompanying drawings.

This invention relates to automobible loading systems and refers more particularly to an improved method and mechanism for loading automobiles in freight cars for shipment.

In loading automobiles in freight cars the number of automobiles which can be shipped in a single car is limited both by the dimensions of the car and by the size of the opening through which the automobiles are inserted. With certain sizes of cars, while there may be sufficient space for loading more than two automobiles, the size of the side door opening of the car and its position with relation to the walls of the car are such as to prevent more than two automobiles from being run in on to the floor of the car. Thus in cars of thirty-six or forty foot length it is customary to ship only two automobiles in the freight car and it is among the objects of the present invention to provide an improved loading system by means of which a greater number of automobiles can be stored for shipment in each freight car; to provide means for rigidly holding the automobiles in place during transit; to provide a mechanism which can be economically formed and conveniently attached and detached from the automobile; and in general to provide a new and improved system of loading automobiles or the like in freight cars or other carriers.

The invention also resides in such further details of construction and arrangements and combinations of parts as will more fully hereinafter appear.

In the drawings:

Figure 1 is a perspective view showing my invention partially applied to an automobile;

Fig. 2 is a perspective view showing the automobile turned up on its side ready for movement into the car;

Figure 3:
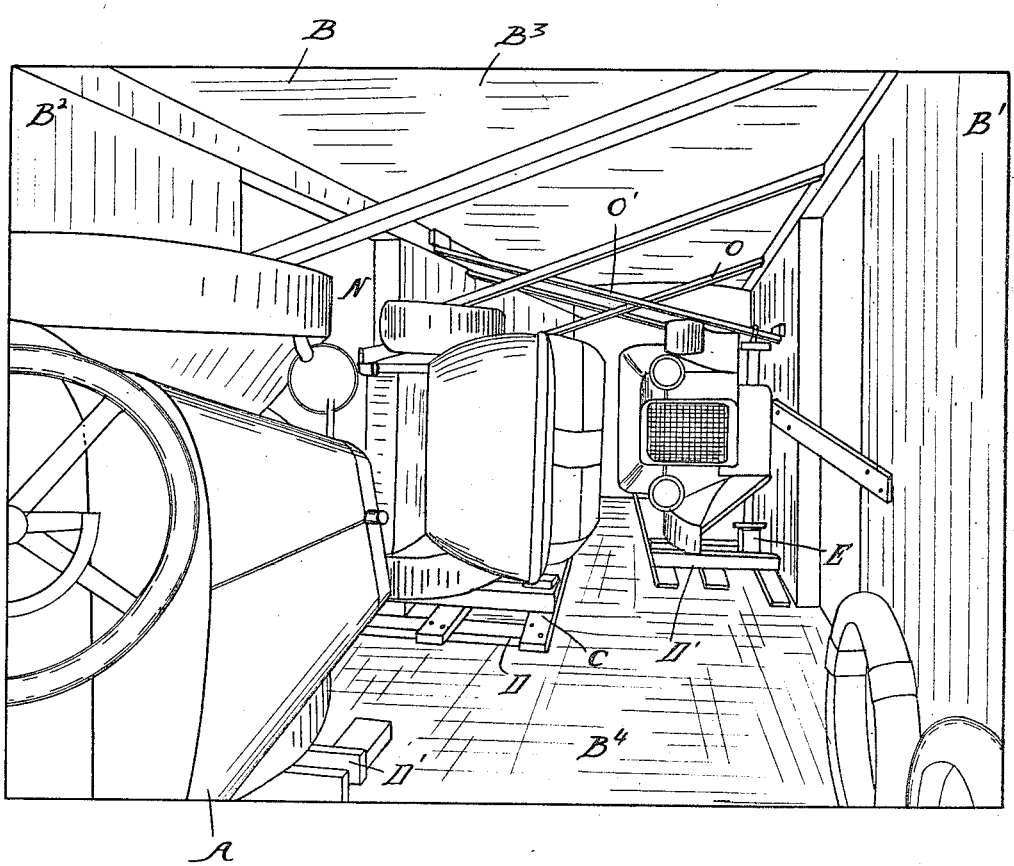
Fig. 3 is an end view showing the automobiles completely loaded in the freight car.

Describing in detail the particular embodiment of my invention shown in the drawings and taking up in order the steps of applying the loading system, A designates an automobile, B the freight car in which it is to be loaded, and B', B², B³ and B⁴ the sides, top and bottom respectively of the freight car. The crate comprises a plurality of planks C which are connected together at their ends by heavy uprights D and D' and at their center by a middle upright D². Fastened to the upright D' is a block E which is recessed at E' to form a seat for receiving the end F' of the front axle F. A similar block E is provided for receiving the end of the rear axle, and in securing the crate to the automobile the latter is first run on to the loading platform and jacked up by mechanism such as the blocks G. The front and rear wheels on one side are then removed and the crate placed alongside the automobile so that its seats E' register with the ends of the axles. The crate is then shoved toward the automobile so as to force the ends of the axles into the seats E', after which the crate and automobile are tied together by suitable wires H. A diagonal brace I is run from the upper end of the crate so as to rest against the spring brackets I'. A second brace J is run from the upper end of the middle upright D² inwardly and downwardly so that its inner end rests against the engine K. The second tie wires L are looped around the spring brackets and fastened to the uprights so as to securely tie the crate to the automobile.

The next step in the loading operation consists in turning the crate and automobile up on to its side to the position shown in Fig. 2; and to facilitate the movement of the automobile from the loading platform into the car, the crate is preferably arranged to rest on suitable rolling devices, such as the dollies M. The automobile and crate are then rolled through the side door N, the wheels on the other side being removed, and the automobile then placed adjacent the side wall with the axles positioned adjacent the side wall of the freight car.

As shown in Fig. 3 the two cars at each end of the freight car are turned in opposite directions so as to more conveniently fit in the car. After being properly positioned, the crate is nailed to the floor and diagonal braces O and O' run from the opposite sides of the freight car. These braces preferably clamp the upper end of the axles rigidly against the side walls of the freight car and in this manner the entire automobile structure is fixedly secured in the car. After the two automobiles have been placed in one end of the car, a third automobile is placed in the opposite end and in case of a freight car of about the forty foot length size, it is possible by the use of my invention to place two automobiles in each end of the freight car. In thirty-six foot length cars the turning space inside of the car is too small to permit the insertion of the fourth automobile where those of the larger size are being shipped. The additional space in such cases can of course be utilized for the storage of extra tires, wheels, accessories or other articles. However, with both the thirty-six and forty foot length cars it is possible to store a greater number of automobiles for shipment than with other systems of loading, as the height of such cars is generally too low to permit of double decking the automobiles.

In removing the automobile from the freight car the following is the preferred operation: First remove the braces O and O' from the side of the car and axle spindles; pry a portion of the crate B loose from the floor of the freight car and lift the automobile and crate high enough to permit the insertion of the dollies or other rolling devices. The automobile and crate are then rolled out of the freight car on to the platform. The front and rear wheels are then placed on the axle spindles on the upper side of the automobile and the automobile and the crate still intact are then tipped over so that the two wheels already mounted will carry the weight on one side and the other side can then be jacked up or blocked by blocks G. The wires L and H are loosened and removed and then the entire crate can be removed from the automobile. The other pair of wheels are then placed on the spindles and the blocks can be removed, thus completing the unloading operation.

By this novel method and mechanism for loading and unloading the automobiles they can be rolled into and out of the freight car, the crate serving as a platform which prevents them from being scraped along the floor when being loaded.

While I have shown and described a particular form of crate it is of course understood that various modifications of the mechanism and loading operation can be made within the scope of my invention.

What I claim as my invention is:—

1. The method of loading automobiles in freight cars which comprises securing a crate to one side of the automobile, turning the automobile on to its side so as to rest on said crate, and securing the crate and automobile as a unit in the freight car.

2. The method of loading automobiles in freight cars which comprises removing the wheels from one side of the automobile, securing a crate to said side of the automobile, turning the automobile on its side so as to rest on the crate, and rolling the crate and automobile as a unit into the freight car.

3. The method of loading automobiles in freight cars which comprises removing the wheels from one side of the automobile, securing a crate to said side of the automobile, turning the automobile on its side so as to rest on the crate, rolling the crate and automobile as a unit into the freight car, and bracing the upper side of the automobile against the side of the freight car.

4. In a system for loading automobiles in freight cars, the combination with a crate having seats for receiving the axle spindles on one side of the automobile, of means for securing said crate to one side of the automobile, and means for bracing said automobile and crate against the side of the freight car.

5. In a system for loading automobiles or the like in freight cars, the combination with an automobile, of a crate secured to one side of the automobile and forming a supporting platform therefor when the automobile is turned upon its side.

6. In a system for loading automobiles or the like in freight cars, the combination with an automobile, of a crate secured to one side of the automobile and forming a supporting platform therefor when the automobile is turned upon its side, said crate having diagonal braces engaging portions of the automobile, and means for tying said crate and automobile to move as a unit.

7. In a system for loading automobiles or the like in freight cars, the combination with automobiles, of means for loading a plurality of said automobiles in freight cars, said means comprising crates secured to one side of the automobiles, each of said crates and automobiles being movable as a unit into storage position in the car, and means for securing said crate to the floor of the car.

In testimony whereof I affix my signature.

HARRY R. MOULE.